United States Patent
Jiang et al.

(10) Patent No.: US 10,253,237 B1
(45) Date of Patent: Apr. 9, 2019

(54) FILM FORMER USED FOR COAL-BED GAS WELL DRILLING AND PREPARATION METHOD THEREOF, DRILLING FLUID AND USAGE THEREOF

(71) Applicant: China University of Petroleum (Beijing), Beijing (CN)

(72) Inventors: Guancheng Jiang, Beijing (CN); Deli Gao, Beijing (CN); Shuo Zhang, Beijing (CN); Yong Wang, Beijing (CN); Xianzhu Wu, Chengdu (CN); Liexiang Han, Beijing (CN); Xiangzeng Wang, Beijing (CN); Chunyao Peng, Beijing (CN); Yinbo He, Beijing (CN); Fan Liu, Beijing (CN); Hongguo Zuo, Beijing (CN); Yongqing Zhang, Beijing (CN); Lili Yang, Beijing (CN); Zhong Li, Beijing (CN); Yanjun Li, Beijing (CN)

(73) Assignee: CHINA UNIVERSITY OF PETROLEUM (BEIJING) (CN)

( * ) Notice: Subject to any disclaimer, the term of this patent is extended or adjusted under 35 U.S.C. 154(b) by 0 days.

(21) Appl. No.: 16/130,694

(22) Filed: Sep. 13, 2018

(51) Int. Cl.
| | |
|---|---|
| C08G 18/08 | (2006.01) |
| C08G 18/04 | (2006.01) |
| C08G 18/06 | (2006.01) |
| C09K 8/12 | (2006.01) |

(52) U.S. Cl.
CPC ............... *C09K 8/12* (2013.01); *C08G 18/08* (2013.01); *C08G 18/04* (2013.01); *C08G 18/06* (2013.01)

(58) Field of Classification Search
CPC ........ C08G 18/04; C08G 18/06; C08G 18/08; C09K 8/12
See application file for complete search history.

(56) References Cited

U.S. PATENT DOCUMENTS

| | | | | |
|---|---|---|---|---|
| 3,297,745 | A * | 1/1967 | Fekete | ............ C08F 20/34 525/455 |
| 4,659,780 | A * | 4/1987 | Stamegna | ......... C08G 18/0823 524/539 |
| 5,275,372 | A * | 1/1994 | Boeckeler | ............ B29C 33/40 249/134 |
| 2010/0266348 | A1 | 10/2010 | Boulkertous et al. | |
| 2016/0032178 | A1 | 2/2016 | Fitzgerald et al. | |
| 2016/0229938 | A1 | 8/2016 | Jiang et al. | |
| 2016/0257876 | A1 | 9/2016 | Zielinski et al. | |
| 2018/0201821 | A1 | 7/2018 | Jiang et al. | |

FOREIGN PATENT DOCUMENTS

| | | |
|---|---|---|
| CN | 101503609 A | 8/2009 |
| CN | 101768243 A | 7/2010 |
| CN | 104193916 A | 12/2014 |
| CN | 104610485 A | 5/2015 |
| CN | 104910877 A | 9/2015 |
| CN | 105064036 A | 11/2015 |
| CN | 105254240 A | 1/2016 |
| CN | 105601832 | 5/2016 |
| CN | 106634894 A | 5/2017 |
| CN | 106753289 A | 5/2017 |
| WO | 201414614 A1 | 9/2014 |

* cited by examiner

*Primary Examiner* — Aiqun Li
(74) *Attorney, Agent, or Firm* — Calfee, Halter & Griswold LLP

(57) ABSTRACT

The present invention relates to the well drilling field in the petroleum industry, particularly to film former used for coal-bed gas well drilling and preparation method thereof, drilling fluid and usage thereof. The preparation method of the film former includes: (1) controlling polycaprolactone diol and diisocyanate to have a first polymerization reaction in the presence of a polyurethane catalyst, to obtain a polyurethane prepolymer with two ends blocked by diisocyanate; (2) controlling the product of the first polymerization reaction to have a chain extension reaction with a polyalcohol; (3) controlling the product of the chain extension reaction and one part of hydroxyalkyl acrylate monomer to have an additive reaction, and then introducing the other part of hydroxyalkyl acrylate monomer and a styrene monomer, and emulsifying in water to obtain an emulsion; (4) mixing a radical initiator with the emulsion to have a second polymerization reaction.

20 Claims, No Drawings

FILM FORMER USED FOR COAL-BED GAS WELL DRILLING AND PREPARATION METHOD THEREOF, DRILLING FLUID AND USAGE THEREOF

CROSS REFERENCE TO RELATED APPLICATIONS

This application claims priority to Chinese application no. 201710855400.4, filed on Sep. 20, 2017, entitled "film former used for coal-bed gas well drilling and preparation method thereof, drilling fluid and usage thereof", which is specifically and entirely incorporated by reference.

FIELD OF THE INVENTION

The present invention relates to the well drilling field in the petroleum industry, particularly to a film former used for coal-bed gas well drilling, a preparation method thereof, a drilling fluid and a usage thereof.

BACKGROUND OF THE INVENTION

Coal-bed gas reservoir is quite different from ordinary sandstone or carbonate reservoir, and has characteristics such as high adsorbability, low permeability, and susceptibility to compression and fracture, etc. Owing to those characteristics, the coal bed is subjected to much more severe injuries than an ordinary reservoir in the coal-bed gas well drilling process, and the injuries of the coal-bed gas reservoir have direct influence on the desorption, diffusion, migration, and subsequent drainage and mining. Therefore, close attention should be paid to the coal-bed gas reservoir injury problem. A coal bed is mainly subject to the following injury factors owing to its characteristics:
(1) The development of coal bed pores and fissures provides an objective condition for the solid phase and liquid phase in external fluids to invade into the coal bed;
(2) The pore-fissures system and the nature of macromolecular organic substance of coal create a condition for adsorption of water and high molecular polymers in external fluids, which has influence on the permeability of the coal bed;
(3) The water in the coal bed may have chemical reactions with external fluids easily, and the resultant compound precipitates may block the fissures in the coal bed;
(4) Since most coal reservoirs are in an under-compacted state, leakage may occur easily during drilling and cause serious injuries to the coal-bed gas reservoir;
(5) The coal bed is highly sensitive to stress, and the stress damage resulted from many factors in the drilling process causes decreased reservoir permeability;
(6) The coal rocks have low mechanical strength, and the coal powder generated in the well drilling process may block the pores and fractures in the coal bed and thereby result in damages to the solid phase in the coal bed.

The Patent Document No. CN104910877A has disclosed a film former composition for drilling fluids, which contains at least one modified phenol-formaldehyde resin, at least one hydrophobic monomer, at least one acrylate, and at least one epoxy resin. The film former obtained in the patent application can achieve relatively low coal bed leakage at higher temperatures; however, the patent application hasn't mentioned any coal-bed gas reservoir protection feature of the film former.

Drilling fluids are reputed as the blood for well drilling. Good drilling fluid techniques are one of the important guarantees for safe, high-quality, efficient, and quick well drilling production. Drilling/completion fluids are required in the exploitation of coal-bed gasses. Effective reservoir protection is an important guarantee for a high rate of oil and gas recovery, so as to attain an optimal negative skin coefficient. If the drilling/completion fluid is designed or used inappropriately in the well drilling/completion process, the liquid and solid in the drilling fluid may intrude into the oil reservoir and have physical and chemical reactions with clay and other minerals in the oil and gas layer. Consequently, the permeability in the oil layer in the immediate vicinity of the well may be decreased severely, and the resistance against oil and gas flow towards the bottom of the well may be increased, resulting in reduced oil yield. The injuries to the reservoir have critical impacts on effective exploitation of the reservoir. The major forms of reservoir damages happened in the coal-bed gas well drilling process include:
(1) The drilling fluid is absorbed by the coal rocks, resulting in decreased permeability of the coal rocks;
(2) The solid particles in the drilling fluid fill and plug the channels formed by fissures;
(3) A polymer drilling fluid invades into the coal bed and causes clay flocculation and blockage under the adsorptive action of high molecular polymers, as well as clay swelling and blockage under the action of carboxyl hydration, and thereby results in decreased permeability of the coal bed;
(4) The drilling fluid interacts with the formation water and generate solid precipitates, which result in blockage of channels formed by pores.

Production factors in the well drilling process, such as excessively high pressure of the drilling fluid column, reservoir bed soaked in the drilling fluid for an excessively long time, and excessively high pressure, etc., may also cause injuries to the coal bed. Furthermore, well cementing operation and reservoir reformation measures taken to improve the yield (e.g., hydraulic fracturing) may also cause injuries to the coal-bed gas reservoir in different degree.

SUMMARY OF THE INVENTION

In view the problem that the coal-bed gas reservoirs are subject to injuries and damages in the prior art, the present invention provides a film former that is used for coal-bed gas well drilling and helpful for coal-bed gas reservoir protection, a preparation method of the film former, and a drilling fluid and an usage of the drilling fluid.

To attain the objects described above, in a first aspect, the present invention provides a method for preparing a film former used for coal-bed gas well drilling, which comprises:
(1) controlling polycaprolactone diol and diisocyanate to have a first polymerization reaction in the presence of a polyurethane catalyst, to obtain a polyurethane prepolymer with two ends blocked by diisocyanate;
(2) controlling the product of the first polymerization reaction to have a chain extension reaction with a polyalcohol;
(3) controlling the product of the chain extension reaction and one part of hydroxyalkyl acrylate monomer to have an additive reaction, and then introducing the other part of hydroxyalkyl acrylate monomer and a styrene monomer, and emulsifying in water to obtain an emulsion;
(4) mixing a radical initiator with the emulsion to have a second polymerization reaction;
wherein, the number-average molecular weight of the polycaprolactone diol is 1,000-6,000;

the weight ratio of the diisocyanate:the polycaprolactone diol:the hydroxyalkyl acrylate monomer:the styrene monomer is 100:20-80:50-150:10-50.

In a second aspect, the present invention provides a film former prepared by the method described above.

In a third aspect, the present invention provides a water-based drilling fluid that contains the above-mentioned film former.

In a fourth aspect, the present invention provides an usage of the above-mentioned water-based drilling fluid in coal-bed gas well drilling.

The film former provided in the present invention enables a drilling fluid system to have good film-forming performance on rock surfaces, and is helpful for protection of coal-bed gas reservoir.

DETAILED DESCRIPTION OF THE EMBODIMENTS

The ends points and any value in the ranges disclosed in the present invention are not limited to the exact ranges or values; instead, those ranges or values shall be comprehended as encompassing values that are close to those ranges or values. For numeric ranges, the end points of the ranges, the end points of the ranges and the discrete point values, and the discrete point values may be combined to obtain one or more new numeric ranges, which shall be deemed as having been disclosed specifically in this document.

In a first aspect, the present invention provides a method for preparing a film former used for coal-bed gas well drilling, which comprises:
(1) controlling polycaprolactone diol and diisocyanate to have a first polymerization reaction in the presence of a polyurethane catalyst, to obtain a polyurethane prepolymer with two ends blocked by diisocyanate;
(2) controlling the product of the first polymerization reaction to have a chain extension reaction with a polyalcohol;
(3) controlling the product of the chain extension reaction and one part of hydroxyalkyl acrylate monomer to have an additive reaction, and then introducing the other part of hydroxyalkyl acrylate monomer and a styrene monomer, and emulsifying in water to obtain an emulsion;
(4) mixing a radical initiator with the emulsion to have a second polymerization reaction;
wherein, the number-average molecular weight of the polycaprolactone diol is 1,000-6,000;
the weight ratio of the diisocyanate:the polycaprolactone diol:the hydroxyalkyl acrylate monomer:the styrene monomer is 100:20-80:50-150:10-50.

According to the present invention, preferably, the weight ratio of the diisocyanate:the polycaprolactone diol:the hydroxyalkyl acrylate monomer:the styrene monomer is 100:30-60:80-150:10-50, preferably is 100:40-50:100-120:20-40, more preferably is 100:40-50:100-120:30-40.

According to the present invention, within the above-mentioned dose range, in the step (1), the polyurethane prepolymer with two ends blocked by diisocyanate is obtained through an addition condensation reaction between polycaprolactone diol and diisocyanate.

Wherein, the number-average molecular weight of the polycaprolactone diol preferably is 2,000-5,000, e.g., 3,000-4,000. The polycaprolactone diol may be dehydrated before it is used; for example, it may be vacuum-dehydrated at 100-140° C. for 1-3 h.

According to the present invention, the polyurethane catalyst may be a metal organic compound polyurethane catalyst, preferably is one or more of dibutyltin dilaurate, octylstannylene, and 2-ethylhexanolstannylene, more preferably is dibutyltin dilaurate and/or octylstannylene.

According to the present invention, the dose of the polyurethane catalyst may vary within a wide range. To produce a polymer that is more suitable for a film former for drilling fluids, preferably, based on the total weight of the polycaprolactone diol and the diisocyanate, the dose of the polyurethane catalyst is 0.05-2 wt %, preferably is 0.05-1 wt %.

According to the present invention, the diisocyanate preferably is one or more of diphenylmethane-4,4'-diisocyanate (4,4'-MDI), diphenylmethane-2,4'-diisocyanate (2,4'-MDI), diphenylmethane-2,2'-diisocyanate (2,2'-MDI), isophorone diisocyanate (IPDI), hexamethylene diisocyanate (HDI), 2,4-toluene diisocyanate (2,4-TDI), 2-6-toluene diisocyanate (2,6-TDI), 1,5-naphthalene diisocyanate (1,5-NDI), and 1,8-naphthalene diisocyanate (1,8-NDI), more preferably is isophorone diisocyanate (IPDI).

Preferably, in the step (1), the conditions of the first polymerization reaction include: temperature: 60-90° C., time: 2-5 h. More preferably, in the step (1), the conditions of the first polymerization reaction include: temperature: 70-90° C., time: 3-4 h.

According to the present invention, in the step (2), the mixture including all product obtained in the step (1) is mixed with a polyalcohol to have a reaction, so that the polyalcohol, the remaining diisocyanate, and the polyurethane prepolymer with two ends blocked by diisocyanate have an addition polymerization reaction under the action of the polyurethane catalyst in the step (1), to obtain polyurethane with extended chain segments.

Wherein, the polyalcohol preferably is one or more of dihydromethyl propionic acid, 1,4-butanediol, glycerol, sorbitol, ethylene glycol, pentaerythritol, and mannitol, more preferably is a combination of dihydromethyl propionic acid and 1,4-butanediol, particularly preferably is a combination of dihydromethyl propionic acid and 1,4-butanediol at 1:0.5-1 weight ratio.

According to the present invention, the dose of the polyalcohol may vary within a wide range. To obtain polyurethane with moderately extended chain segments through the chain extension reaction, preferably, the weight ratio of the diisocyanate to the polyalcohol is 100:5-20, preferably is 100:10-15.

Preferably, in the step (2), the conditions of the chain extension reaction include: temperature: 50-80° C., time: 1-4 h. More preferably, the conditions of the chain extension reaction include: temperature: 50-80° C., time: 1-4 h.

According to the present invention, in the step (3), one part of hydroxyalkyl acrylate monomer and the product obtained through the chain extension reaction in the step (3) are controlled to have an additive reaction first, so that the hydroxyl groups in the hydroxyalkyl acrylate monomer have an additive reaction with the terminal diisocyanate in the product of the chain extension reaction, and thereby the polyurethane obtained through the chain extension reaction bears carbon-carbon double bonds provided by hydroxyalkyl acrylate; thus, in the following free radical polymerization, the carbon-carbon double bonds provided by hydroxyalkyl acrylate on the polyurethane have a polymerization reaction with free hydroxyalkyl acrylate monomer and styrene monomer or a polymer of hydroxyalkyl acrylate monomer and styrene monomer to form a three-dimensional network structure, and thereby a film former according to the present invention is obtained.

Wherein, preferably, the hydroxyalkyl acrylate monomer is one or more of hydroxymethyl methacrylate, hydroxyethyl methacrylate, hydroxypropyl methacrylate, hydroxymethyl acrylate, hydroxyethyl acrylate, and hydroxypropyl acrylate. Preferably, the weight ratio of said one part of hydroxyalkyl acrylate monomer to the other part of hydroxyalkyl acrylate monomer is 1:1-5.

According to the present invention, the styrene monomer preferably is one or more of styrene, p-methyl styrene, in-methyl styrene, o-methyl styrene, p-ethyl styrene, in-ethyl styrene, o-ethyl styrene, 2,4-dimethyl styrene, 2,5-dimethyl styrene, and 2,6-dimethyl styrene.

According to the present invention, in the step (3), the dose of water may vary in a wide range, as long as an emulsion suitable for the second polymerization reaction can be obtained. Preferably, in the step (3), based on the total weight of the diisocyanate, the polycaprolactone diol, the hydroxyalkyl acrylate monomer, and the styrene monomer, the dose of the water is 20-50 wt %, e.g., 25-35 wt %.

According to the present invention, to improve the dispersity among the organic substances, an organic solvent may be introduced before the emulsification in the step (3). The organic solvent may be one or more of triethylamine, ethylene diamine, ethanol amine, and di-ethanolamine, etc., for example, and the dose of the organic solvent may vary within a wide range; preferably, in the step (3), based on the total weight of the diisocyanate, the polycaprolactone diol, the hydroxyalkyl acrylate monomer, and the styrene monomer, the dose of the organic solvent is 2-10 wt %, preferably is 5-8 wt %.

According to the present invention, preferably, in the step (3), the conditions of the additive reaction include: temperature: 50-70° C., time: 0.5-3 h; the conditions of the emulsification include: temperature: 30-60° C. (preferably 40-50° C.), time: 1-3 h.

According to the present invention, in the step (4), the radical initiator preferably is one or more of potassium persulfate, ammonium persulfate, dibenzoyl peroxide, diisopropyl peroxydicarbonate, dicyclohexyl peroxydicarbonate, isopropyl benzene hydroperoxide, teri-butyl hydroperoxide, azodiisobutyronitrile, and azobisisoheptonitrile, more preferably is one or more of potassium persulfate, ammonium persulfate, dibenzoyl peroxide, diisopropyl peroxydicarbonate, and dicyclohexyl peroxydicarbonate.

Wherein, the dose of the radical initiator may vary within a wide range, as long as the film former according to the present invention can be obtained; preferably, based on the total weight of the hydroxyalkyl acrylate monomer and the styrene monomer, the content of the radical initiator is 0.5-1.5 wt %.

According to the present invention, preferably, in the step (4), the conditions of the second polymerization reaction include: temperature: 60-90° C., time: 2-5 h. More preferably, the conditions of the second polymerization reaction include: temperature: 70-85° C., time: 3-4 h.

Through the process described above, a milk white viscous fluid, i.e., the film former according to the present invention, is obtained finally. The solid content of such a film former is 60-80 wt %.

In a second aspect, the present invention provides a film former prepared by the method described above.

In a third aspect, the present invention provides a water-based drilling fluid that contains the above-mentioned film former.

According to the present invention, the dose of the film former may be selected according to the specific rock formation condition; preferably, with respect to 100 pbw (parts by weight) water in the water-based drilling fluid, the dose of the film former is 1-3 pbw.

Usually, the water-based drilling fluid may further contain other additives for water-based drilling fluid; preferably, the drilling fluid in the present invention contains one or more of bentonite, pH adjuster, filtrate reducer, weighting agent, inhibitor, wettability reversal agent, and protectant, etc.

Wherein, the bentonite is a kind of clay with montmorillonite as the main mineral component, which can render viscous shearing strength, leak-off and wall building capabilities to the drilling fluid; for example, the bentonite may be sodium bentonite and/or calcium bentonite, preferably is sodium bentonite. More preferably, with respect to 100 pbw water in the water-based drilling fluid, the content of the bentonite is 2-5 pbw, more preferably is 2-3 pbw.

Wherein, the pH adjuster ensures that the drilling fluid system is an alkaline environment. For example, the pH adjuster may be selected from one or more of sodium hydroxide, potassium hydroxide, potassium carbonate, and sodium carbonate. More preferably, with respect to 100 pbw water in the water-based drilling fluid, the content of the pH adjuster is 0.3-1 pbw.

Wherein, the filtrate reducer can improve the leak-off and wall building capabilities of the drilling fluid. For example, the filtrate reducer may be selected from one or more of polymeric filtrate reducer (trade name: Redul), PAC-LV, ammonium salt, sulfomethylated phenolic resin (e.g., trade name: SMP-I, SMP-II), sulfomethylated lignite resin (e.g., trade name: SPNH), and zwitterionic polymer JT-888, preferably is one or more of Redul, SMP-II and SPNH. More preferably, with respect to 100 pbw water in the water-based drilling fluid, the content of the filtrate reducer is 2-5 pbw.

Wherein, the purpose of the weighting agent is to adjust the density of the drilling fluid to a required density. For example, the weighting agent may be one or more of barite (e.g., barite with 90 wt % or higher barium sulfate content), organic salts (Weigh-1, Weigh-2 (the active ingredient is potassium formate), Weigh-3, and organic sodium salt GD-WT), and inorganic salts (e.g., NaCl, KCl, and $BaSO_4$), etc. Preferably, with respect to 100 pbw water in the water-based drilling fluid, the content of the weighting agent is 2-5 pbw.

Wherein, the inhibitor can inhibit hydrated swelling of the rock formation. For example, the inhibitor may be polyethylene glycol (with number-average molecular weight within a range of 2,000-20,000). More preferably, with respect to 100 pbw water in the water-based drilling fluid, the content of the inhibitor is 2-5 pbw.

Wherein, the wettability reversal agent can be absorbed to the rock surface very easily and decreases the surface energy of the rock surface, so that the rock is bestowed with a hydrophobic and oleophobic property, water and oil intrusion can be avoided effectively, and the occurrence of a capillary phenomenon can be prevented, and thereby a well wall stabilization and reservoir protection effect is attained. For example, the hydrophobic and oleophobic wettability reversal agent disclosed in the Patent Document No. CN 106634894 A may be used. More preferably, with respect to 100 pbw water in the water-based drilling fluid, the content of the wettability reversal agent is 0.5-0.8 pbw.

Wherein, the protectant can protect the reservoir from water-sensitivity damage brought by the drilling fluid and inhibit hydrated swelling and dispersion of mud shale. For example, such a protectant may be the reservoir protectant disclosed in the Patent Document No. CN 104610485 A. More preferably, with respect to 100 pbw water in the water-based drilling fluid, the content of the protectant is 1-4 pbw.

Each of the above additives may be commercially available products, or may be prepared with conventional methods in the art. They will not be further detailed hereunder.

In a fourth aspect, the present invention provides a usage of the above-mentioned water-based drilling fluid in coal-bed gas well drilling.

The film former provided in the present invention enables a drilling fluid system to have good film-forming performance on rock surfaces, and is helpful for protection of coal-bed gas reservoir.

Hereunder the present invention will be detailed in embodiments.

EXAMPLE 1

This example is provided to describe the film former and the preparation method of the film former provided in the present invention.

(1) 40 pbw polycaprolactone diol (with number-average molecular weight equal to 2,000, from DAICEL Group) is heated up to 120° C. and vacuum-dehydrated at this temperature for 2 h; then the polycaprolactone diol is cooled to 80° C., 100 pbw isophorone diisocyanate is added, and then dibutyltin dilaurate is added by dropwise adding (based on the total weight of the polycaprolactone diol and the diisocyanate, the dose of the dibutyltin dilaurate is 0.08 wt %), and the obtained mixture is held at 80° C. for 3 h for reaction;

(2) The product obtained in the step (1) is cooled to 70° C., 5 pbw dried and dehydrated dihydromethyl propionic acid and 10 pbw dried and dehydrated 1,4-butanediol are added, and the obtained mixture is held at 70° C. for 2 h for chain extension reaction;

(3) The product obtained through the chain extension reaction is cooled to 60° C., 50 pbw hydroxyethyl methacrylate is added, and the obtained mixture is held at 60° C. for 1.5 h for reaction; then, the resultant product is cooled to 40° C., 70 pbw hydroxyethyl methacrylate, 30 pbw styrene, and 20 pbw ethylene diamine are added, and the obtained mixture is stirred for 0.5 h, then 100 pbw water is added to emulsify and disperse at a high speed to obtain an emulsion;

(4) Potassium persulfate (based on the total weight of the hydroxyalkyl acrylate monomer and the styrene monomer, the dose of the potassium persulfate is 1 wt %) is added into the emulsion, and the mixture is held at 80° C. for 3.5 h for free radical polymerization; thus, a milk white viscous liquid, i.e., a film former CM-1, is obtained, and the solid content of the liquid (percentage of the weight in dryness to the total weight of the liquid) is 70 wt %.

EXAMPLE 2

This example is provided to describe the film former and the preparation method of the film former provided in the present invention.

(1) 50 pbw polycaprolactone diol (with number-average molecular weight equal to 3,000, from DAICEL Group) is heated up to 120° C. and vacuum-dehydrated at this temperature for 2 h; then the polycaprolactone diol is cooled to 90° C., 100 pbw diphenylmethane-4,4'-diisocyanate is added, and then dibutyltin dilaurate is added by dropwise adding (based on the total weight of the polycaprolactone diol and the diisocyanate, the dose of the dibutyltin dilaurate is 0.05 wt %), and the obtained mixture is held at 90° C. for 2.5 h for reaction;

(2) The product obtained in the step (1) is cooled to 80° C., 8 pbw dried and dehydrated pentaerythritol and 2 pbw dried and dehydrated ethylene glycol are added, and the obtained mixture is held at 80° C. for 3 h for chain extension reaction;

(3) The product obtained through the chain extension reaction is cooled to 65° C., 40 pbw hydroxypropyl methacrylate is added, and the obtained mixture is held at 65° C. for 2 h for reaction; then, the resultant product is cooled to 50° C., 60 pbw hydroxypropyl methacrylate, 40 pbw p-methyl styrene, and 15 pbw triethylamine are added, and the obtained mixture is stirred for 0.5 h, then 120 pbw water is added to emulsify and disperse at a high speed to obtain an emulsion;

(4) Ammonium persulfate (based on the total weight of the hydroxyalkyl acrylate monomer and the styrene monomer, the dose of the ammonium persulfate is 1.2 wt %) is added into the emulsion, and the mixture is held at 75° C. for 4 h for free radical polymerization; thus, a milk white viscous liquid, i.e., a film former CM-2, is obtained, and the solid content of the liquid (percentage of the weight in dryness to the total weight of the liquid) is 65 wt %.

EXAMPLE 3

This example is provided to describe the film former and the preparation method of the film former provided in the present invention.

The method described in the example 1 is used, but the polycaprolactone diol is polycaprolactone diol with number-average molecular weight equal to 1,000 from DAICEL group. A film former CM-3 is obtained finally, and the solid content of the film former is 70 wt %.

EXAMPLE 4

This example is provided to describe the film former and the preparation method of the film former provided in the present invention.

The method described in the embodiment 1 is used, but:

The dose of the polycaprolactone diol is 20 pbw;

The total dose of the hydroxyethyl methacrylate is 150 pbw, wherein, 80 pbw hydroxyethyl methacrylate is introduced first to have a reaction with the product of the chain extension reaction, and then the remaining hydroxyethyl methacrylate is introduced;

A film former CM-4 is obtained finally, and the solid content of the film former is 72 wt %.

EXAMPLE 5

This example is provided to describe the film former and the preparation method of the film former provided in the present invention.

The method described in the embodiment 1 is used, but:

The dose of the polycaprolactone diol is 80 pbw;

The total dose of the hydroxyethyl methacrylate is 60 pbw, wherein, 30 pbw hydroxyethyl methacrylate is introduced first to have a reaction with the product of the chain extension reaction, and then the remaining hydroxyethyl methacrylate is introduced;

A film former CM-5 is obtained finally, and the solid content of the film former is 70 wt %.

COMPARATIVE EXAMPLE 1

This comparative example is provided to describe the film former and the preparation method of the film former according to reference method.

The method described in the example 1 is used, but the polycaprolactone diol is polycaprolactone diol with number-average molecular weight equal to 500 from DAICEL group. A film former DCM-1 is obtained finally, and the solid content of the film former is 70 wt %.

COMPARATIVE EXAMPLE 2

This comparative example is provided to describe the film former and the preparation method of the film former according to reference method.

The method described in the example 1 is used, but:
The dose of the polycaprolactone diol is 120 pbw;
The total dose of the hydroxyethyl methacrylate is 40 pbw, wherein, 20 pbw hydroxyethyl methacrylate is introduced first to have a reaction with the product of the chain extension reaction, and then the remaining hydroxyethyl methacrylate is introduced;
A film former DCM-2 is obtained finally, and the solid content of the film former is 70 wt %.

COMPARATIVE EXAMPLE 3

This comparative example is provided to describe the film former and the preparation method of the film former according to reference method.

The method described in the example 1 is used, but:
The dose of the polycaprolactone diol is 10 pbw;
The total dose of the hydroxyethyl methacrylate is 180 pbw, wherein, 100 pbw hydroxyethyl methacrylate is introduced first to have a reaction with the product of the chain extension reaction, and then the remaining hydroxyethyl methacrylate is introduced;
The dose of the styrene is 10 pbw;
A film former DCM-3 is obtained finally, and the solid content of the film former is 72 wt %.

COMPARATIVE EXAMPLE 4

This comparative example is provided to describe the film former and the preparation method of the film former according to reference method.

The method described in the example 1 is used, but the styrene is replaced with 30 pbw hydroxyethyl methacrylate, i.e., in the step (3), the dose of the latter part of hydroxyethyl methacrylate is 100 pbw;
A film former DCM-4 is obtained finally, and the solid content of the film former is 70 wt %.

PREPARATION EXAMPLE 1 OF THE PROTECTANT

Styrene (15 g, 0.14 mol), N,N-dimethylamino ethyl methacrylate (11.3 g, 0.072 mol), 2-acrylamido-2-methyl propanesulfonic acid (14.9 g, 0.072 mol), and N,N-diethylacrylamide (3.66 g, 0.029 mol) are added into 100 mL water, and the mixture is stirred to form an emulsion; nitrogen is charged into the emulsion for 30 min., then the emulsion is heated up to 70° C. and at the same time 0.5 g 4,4'-azobis (4-cyanovaleric acid) is added; next, the emulsion is further heated up to 75° C. and held at this temperature for 6 h for reaction; after the reaction is completed, the reaction solution is cooled to room temperature (20° C.), and the aqueous dispersion of the product is evaporated in a rotary evaporator to dry state, and the obtained solid is pulverized; thus, an amphiphilic reservoir protectant QJ-1 according to the present invention is obtained. The weight-average molecular weight is 213,200 g/mol, and the molecular weight distribution index is 2.3.

PREPARATION EXAMPLE 1 OF WETTABILITY REVERSAL AGENT (1) 0.12mol N,N-dimethyl-1,3-propylene diamine is dissolved in 250 mL methylene chloride at 0-5° C., then 0.12 mol triethylamine is added, and the obtained mixture is stirred for 30 min.; next, 0.1 mol perfluoro butanesulfonylfluoride is added by dropwise adding at 0-5° C. (the addition is completed within about 30 min., trade name 375-72-4 from Hubei Jusheng Technology Co., Ltd.), the mixture is held at 0-5° C. for 60 min. for further reaction, and then is cooled to 25° C. and held at this temperature for 4 h for reaction; the obtained product is filtered, the filter cake is washed with methylene chloride, dried, and then recrystallized with acetone; thus, a 128.7 g white solid is obtained;
(2) 10 mmol compound obtained in the step (1) is dissolved in 50 mL ethanol at 65° C., then 11 mmol 1,4-dibromobutane is added by dropwise adding (the addition is completed within about 20 min.), and the mixture is stirred at 75° C. for 6 h for reaction; the product of the reaction is cooled to room temperature (about 25° C.) and crystallizes, and then is filtered, and the filter cake is washed and dried; thus, 12.34 g solid, i.e., a wettability reversal agent SS-1, is obtained.

DRILLING FLUID EXAMPLE 1

This example is provided to describe the water-based drilling fluid in the present invention.

Formulation: 100 pbw water, 2 pbw film former CM-1, 1 pbw protectant QJ-1, 1 pbw wettability reversal agent SS-1, 3 pbw polyethylene glycol (PEG600 from Jiangsu Haian Petrochemical Plant), 4 pbw NaCl, 0.3 pbw $Na_2CO_3$, 0.5 pbw NaOH, 3 pbw sodium bentonite (from Shandong Weifang Huawei Bentonite Co., Ltd., the same below), and 3 pbw SMP-II (from Jiangxi Pingxiang Hengchang New Chemical Materials Co., Ltd., the same below); thus, a water-based drilling fluid Y1 is obtained.

DRILLING FLUID EXAMPLES 2-5

These examples is provided to describe the water-based drilling fluid in the present invention.

The formulation described in the drilling fluid example 1 is used, but the film former CM-1 is replaced with film formers CM-2 to CM-5 respectively. Thus, water-based drilling fluids Y2-Y5 are obtained respectively.

DRILLING FLUID COMPARATIVE EXAMPLES 1-4

These comparative examples is provided to describe the water-based drilling fluid for reference.

The formulation described in the drilling fluid embodiment 1 is used, but the film former CM-1 is replaced with the film formers DCM-1 to DCM-4 respectively. Thus, water-based drilling fluids DY1-DY4 are obtained respectively.

DRILLING FLUID COMPARATIVE EXAMPLE 5

This comparative example is provided to describe the water-based drilling fluid for reference.

The formulation described in the drilling fluid example 1 is used, but the film former CM-1 is omitted. Thus, a water-based drilling fluid DY5 is obtained.

TEST EXAMPLE 1

The rheological property and filtration property of the above-mentioned drilling fluids are measured respectively. Specifically, the apparent viscosity (AV), plastic viscosity (PV), yield point (YP), ratio of initial gel strength/final gel strength (G10″/10′), medium pressure filter loss (API), and high pressure filter loss (HTHP) of the obtained drilling fluids are measured before aging and after aging at 120° C. for 16 h and cooling to room temperature respectively. The results are shown in Table 1, wherein:

The apparent viscosity (AV) is measured with a FANN six-speed viscosity meter with the method specified in the national standard GB/T29170-2012, in unit of mPa·s, AV=1/2$\theta_{600}$.

The plastic viscosity (PV) is measured with a FANN six-speed viscosity meter with the method specified in the national standard GB/T29170-2012, in unit of mPa·s, PV=$\theta_{600}$−$\theta_{300}$.

The yield point (YP) is measured with a FANN six-speed viscosity meter with the method specified in the national standard GB/T29170-2012, YP=0.511×(2×φ300−φ600), in unit of Pa.

The ratio of initial gel strength/final gel strength (G10″/10′) is measured with a FANN six-speed viscosity meter with the method specified in the national standard GB/T29170-2012, in unit of Pa/Pa.

API refers to medium pressure filter loss, and is measured with an medium pressure filter loss meter with the method specified in the standard SY/T5621-93, in unit of mL HTHP (150° C., 3.5 MPa) refers to high-temperature and high-pressure filter loss, and is measured with a HTHP filter loss meter with the method specified in the national standard GB/T29170-2012, in unit of mL

TABLE 1

| Drilling Fluid | AV (mPa · s) | PV (mPa · s) | YP (Pa) | G10″/10′ (Pa/Pa) | API (mL) | HTHP (mL) |
|---|---|---|---|---|---|---|
| Before aging |
| DY5 | 85 | 45 | 49 | 8.0/9.5 | 13.6 | / |
| Y1 | 89 | 46 | 46 | 8.5/9.5 | 5.8 | / |
| Y2 | 86 | 45 | 43 | 8.0/9.0 | 5.9 | / |
| Y3 | 88 | 46 | 45 | 8.5/9.0 | 6.8 | / |
| Y4 | 87 | 48 | 45 | 8.5/9.0 | 6.3 | / |
| Y5 | 85 | 47 | 47 | 8.0/9.5 | 6.5 | / |
| DY1 | 79 | 42 | 42 | 7.5/8.5 | 9.8 | / |
| DY2 | 81 | 43 | 41 | 7.5/8.0 | 9.2 | / |
| DY3 | 82 | 42 | 43 | 8.0/8.5 | 9.1 | / |
| DY4 | 77 | 41 | 40 | 7.5/8.0 | 9.6 | / |
| After aging at 120° C. for 16 h |
| DY5 | 86 | 47 | 46 | 7.0/8.5 | 18.3 | 31.8 |
| Y1 | 87 | 45 | 44 | 6.5/9.0 | 9.2 | 12.5 |
| Y2 | 86 | 44 | 45 | 6.0/8.5 | 9.1 | 12.9 |
| Y3 | 85 | 46 | 44 | 6.0/8.0 | 10.7 | 15.8 |
| Y4 | 85 | 47 | 43 | 6.0/8.5 | 9.9 | 14.5 |
| Y5 | 84 | 46 | 46 | 6.5/8.5 | 10.3 | 15.3 |
| DY1 | 83 | 43 | 41 | 5.5/8.0 | 15.4 | 28.5 |
| DY2 | 82 | 43 | 42 | 5.5/8.5 | 16.3 | 25.1 |
| DY3 | 82 | 42 | 41 | 6.0/8.0 | 15.2 | 24.6 |
| DY4 | 81 | 41 | 40 | 5.5/8.0 | 16.8 | 23.8 |

TEST EXAMPLE 2

(1) The roll recovery ratio testing process is as follows: Each of the above-mentioned drilling fluids measured in 350 mL volume and clear water are loaded into a high-speed mixing cup and stirred at a high speed for 5 min., then the mixture is poured into an aging tank for later use; 6-10mesh drill cuttings are baked at 105° C. to constant weight and then cooled to room temperature. 50 g dried drill cuttings ($G_0$) is weighed and added into a drilling fluid to be tested, aged at 120° C. for 16 h, cooled, and taken out from the aging tank; the well core is recovered using a 40-mesh filter screen (and washed with tap water), baked at 105±3° C. to constant weight, and cooled to room temperature and weighed the recovered well core mass ($G_1$);

Mud shale recovery ratio R=$G_1$/$G_0$×100%

Wherein, $G_0$ is the mass of raw shale, in unit of g; $G_1$ is the mass of recovered shale; R is the recovery ratio of shale, %.

(2) The shale swelling ratio testing process is as follows: Each of the above-mentioned drilling fluid measured in 20 mL volume and clear water are loaded into a beaker for later use; 5 g rock cuttings dried at 105° C. is weighed and loaded into a test cylinder, a plug stick is inserted into the test cylinder, and the test cylinder is held at 4 MPa pressure for 5 min.; thus, a test well core is obtained, and the initial height $h_0$ of the rock sample is measured. The test cylinder with the well core is mounted on a shale swelling tester, a fluid to be tested is injected into the test cylinder, and soaking for a different time, and the swelling amount $h_t$ of the well core is recorded at different time points.

Linear swelling ratio of mud shale: E=($h_t$−$h_0$)/$h_0$×100%. The results are shown in Table 2.

TABLE 2

| Drilling Fluid | Mud shale recovery ratio % | Linear swelling ratio of mud shale % | | |
|---|---|---|---|---|
| | | 2 h | 4 h | 8 h |
| Clear water | 15.6 | 70.1 | 71.8 | 73.5 |
| Y1 | 93.1 | 8.2 | 10.5 | 12.1 |
| Y2 | 92.5 | 8.1 | 10.3 | 12.0 |
| Y3 | 86.6 | 8.3 | 11.6 | 15.3 |
| Y4 | 91.2 | 8.4 | 10.7 | 14.4 |
| Y5 | 89.3 | 8.5 | 10.8 | 14.5 |
| DY1 | 83.5 | 9.2 | 12.3 | 17.2 |
| DY2 | 84.7 | 9.9 | 12.7 | 17.9 |
| DY3 | 83.8 | 10.5 | 13.1 | 18.3 |
| DY4 | 81.9 | 11.3 | 14.6 | 19.5 |

It can be seen from the data in the above Tables 1-2: a water-based drilling fluid that contains the film former according to the present invention attains a good protective effect for shale storage.

While the present invention is described above in detail in some preferred embodiments, the present invention is not limited to those embodiments. Various simple variations, including combinations of the technical features in any other appropriate way, can be made to the technical scheme of the present invention within the scope of the technical concept of the present invention, but such variations and combinations shall be deemed as disclosed content in the present invention and falling in the protection scope of the present invention.

The invention claimed is:

1. A method for preparing a film former used for coal-bed gas well drilling, comprising:
    (1) performing a first polymerization reaction that includes reacting polycaprolactone diol and diisocyanate in the presence of a polyurethane catalyst to obtain a polyurethane prepolymer with two ends blocked by diisocyanate;

(2) reacting the product of the first polymerization reaction with a polyalcohol in a chain extension reaction;

(3) performing an additive reaction on the product of the chain extension reaction and one part of hydroxyalkyl acrylate monomer; and then introducing the other part of hydroxyalkyl acrylate monomer and a styrene monomer, and emulsifying in water to obtain an emulsion;

(4) mixing a radical initiator with the emulsion to have a second polymerization reaction;

wherein the number-average molecular weight of the polycaprolactone diol is 1,000-6,000; and the weight ratio of the diisocyanate:the polycaprolactone diol:the hydroxyalkyl acrylate monomer:the styrene monomer is 100:20-80:50-150:10-50.

2. The method according to claim 1, wherein the weight ratio of the diisocyanate:
   the polycaprolactone diol: the hydroxyalkyl acrylate monomer: the styrene monomer is 100:30-60:80-150:10-50.

3. The method according to claim 1, wherein the weight ratio of the diisocyanate:
   the polycaprolactone diol:the hydroxyalkyl acrylate monomer:the styrene monomer is 100:40-50:100-120:20-40.

4. The method according to claim 1, wherein the diisocyanate is one or more of diphenylmethane-4,4'-diisocyanate, diphenylmethane-2,4'-diisocyanate, diphenylmethane-2,2'-diisocyanate, isophorone diisocyanate, hexamethylene diisocyanate, 2,4-toluene diisocyanate, 2,6-toluene diisocyanate, 1,5-naphthalene diisocyanate, and 1,8-naphthalene diisocyanate;
   the hydroxyalkyl acrylate monomer is one or more of hydroxymethyl methacrylate, hydroxyethyl methacrylate, hydroxypropyl methacrylate, hydroxymethyl acrylate, hydroxyethyl acrylate, and hydroxypropyl acrylate; and
   the styrene monomer is one or more of styrene, p-methyl styrene, m-methyl styrene, o-methyl styrene, p-ethyl styrene, m-ethyl styrene, o-ethyl styrene, 2,4-dimethyl styrene, 2,5-dimethyl styrene, and 2,6-dimethyl styrene.

5. The method according to claim 1, wherein the number-average molecular weight of the polycaprolactone diol is 2,000-5,000.

6. The method according to claim 1, wherein the polyurethane catalyst is one or more of dibutyltin dilaurate, octylstannylene, and 2-ethylhexanolstannylene.

7. The method according to claim 6, wherein based on the total weight of the polycaprolactone diol and the diisocyanate, the dose of the polyurethane catalyst is 0.05-2 wt %.

8. The method according to claim 7, wherein based on the total weight of the polycaprolactone diol and the diisocyanate, the dose of the polyurethane catalyst is 0.05-1 wt %.

9. The method according to claim 1, wherein the polyalcohol is one or more of dihydromethyl propionic acid, 1,4-butanediol, glycerol, sorbitol, ethylene glycol, pentaerythritol, and mannitol.

10. The method according to claim 9, wherein the weight ratio of the diisocyanate to the polyalcohol is 100:5-20.

11. The method according to claim 1, wherein in the step (3), based on the total weight of the diisocyanate, the polycaprolactone diol, the hydroxyalkyl acrylate monomer, and the styrene monomer, the dose of water is 20-50 wt %.

12. The method according to claim 1, wherein the radical initiator is one or more of potassium persulfate, ammonium persulfate, dibenzoyl peroxide, diisopropyl peroxydicarbonate, dicyclohexyl peroxydicarbonate, isopropyl benzene hydroperoxide, teri-butyl hydroperoxide, azodiisobutyronitrile, and azobisisoheptonitrile.

13. The method according to claim 12, wherein based on the total weight of the hydroxyalkyl acrylate monomer and the styrene monomer, the content of the radical initiator is 0.5-1.5 wt %.

14. The method according to claim 1, wherein in the step (1), the conditions of the first polymerization reaction include: temperature: 60-90° C., time: 2-5 h.

15. The method according to claim 1, wherein in the step (2), the conditions of the chain extension reaction include: temperature: 50-80° C., time: 1-4 h.

16. The method according to claim 1, wherein in the step (3), the conditions of the additive reaction include: temperature: 50-70° C., time: 0.5-3 h; the conditions of the emulsification include: temperature: 30-60° C., time: 1-3 h.

17. The method according to claim 1, wherein in the step (4), the conditions of the second polymerization reaction include: temperature: 60-90° C., time: 2-5 h.

18. A film former prepared by the method according to claim 1.

19. A water-based drilling fluid that contains the film former according to claim 18.

20. A method comprising:
   employing the water-based drilling fluid according to claim 19 while drilling a coal-bed gas well.

* * * * *